3,734,961
HERBICIDAL FLUORINATED PHENYL UREAS AND THIOUREAS
John E. Englehart, Westfield, N.J., assignor to Esso Research and Engineering Company
No Drawing. Filed June 25, 1969, Ser. No. 836,666
Int. Cl. C07c 127/16
U.S. Cl. 260—553 A                                   2 Claims

ABSTRACT OF THE DISCLOSURE

Phenyl ureas and phenyl thioureas containing from 2 to 5 fluorine atoms on the phenyl ring are active pesticides, particularly as herbicides, both pre- and post-emergent.

PRIOR ART

Both phenyl ureas and the halogen counterparts thereof are old, and their utility as pesticides are likewise known. For example, S. S. Sharpe et al., Agriculture Chemicals, vol. 8, page 56 (1953) have reported upon the herbicidal properties of phenyl dimethyl urea. Similarly, H. C. Bucha and C. W. Todd in Science, vol. 114, p. 493 (1951), have documented the weed killing properties of a chlorinated phenyl urea, i.e. 3(p-chlorophenyl)-1,1-dimethylurea.

However, it has not been heretofore known that phenyl ureas having 2 to 5 fluorine atoms possess a particularly effective pre- and post-emergent herbicidal activity. The herbicidal effectiveness of such fluorinated phenyl ureas is surprisingly superior to structurally related known halophenyl ureas, such as N,N-dimethyl-N'-(3,4-dichlorophenyl)urea, N,N-dimethyl-N'-(3-trifluoromethylphenyl)urea and N,N-dimethyl-N'-(p-chlorophenyl) urea.

FIELD OF THE INVENTION

This invention relates to novel, fluorinated phenyl ureas and phenyl thioureas and their use as pesticides. More particularly, the invention relates to novel, fluorinated phenyl ureas and phenyl thioureas having from 2 to 5 fluorine atoms, compositions or formulations thereof and processes for their use as pesticides, particularly as pre- and post-emergent herbicides.

SUMMARY OF THE INVENTION

It has been found that polyfluorinated phenyl ureas and phenyl thioureas are particularly useful as pre- and post-emergent herbicides. The polyfluorinated phenyl ureas and phenyl thioureas of the present invention are characterized by the following structural formula:

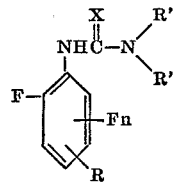

wherein R' can be hydrogen, $C_1$–$C_{12}$ alkyl, $C_1$–$C_{12}$ halo-substituted alkyl, $C_1$–$C_{12}$ hydroxy substituted alkyl; $C_1$–$C_{12}$ alkoxy substituted alkyl; $C_1$–$C_{12}$ alkoxy, $C_2$–$C_{12}$ alkylaminoalkyl, $C_3$–$C_{12}$ dialkylaminoalkyl, $C_2$–$C_{12}$ alkenyl, $C_2$–$C_{12}$ alkynyl, $C_3$–$C_{12}$ cycloalkyl, $C_6$–$C_{12}$ aryl, and $C_7$–$C_{12}$ aralkyl; R can be hydrogen, halogen, hydroxy, mercapto, cyano, nitro, thiocyano, $C_1$–$C_{12}$ alkyl, $C_1$–$C_{12}$ alkoxy, $C_1$–$C_{12}$ thialkoxy, and $C_6$–$C_{10}$ aryl; X can be O or S and n is an integer of from 1 to 4. More preferred as R' groups are hydrogen, $C_1$–$C_6$ alkyl, $C_2$–$C_6$ alkenyl, $C_2$–$C_6$ alkynyl, $C_3$–$C_6$ cycloalkyl, or $C_1$–$C_6$ alkoxy. More preferred as R groups are hydrogen, halogen, cyano, thiocyano, nitro, $C_1$–$C_6$ alkyl, $C_1$–$C_6$ alkoxy, or $C_1$–$C_6$ thioalkoxy.

In general, the urea compounds of this invention can be prepared by the following general methods utilizing a poly-fluorinated aniline as the starting material.

(1) Reaction of a fluorinated aniline with an alkyl or aryl isocyanate:

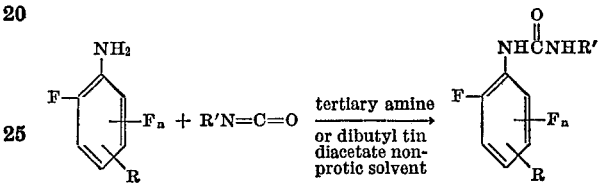

(2) Reaction of a fluorinated aniline with dialkyl carbamoyl chloride:

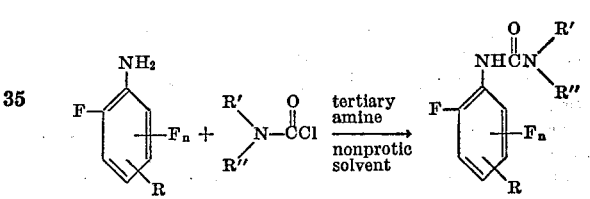

(3) Reaction of a fluorinated aniline with phosgene followed by reaction with a primary or secondary amine:

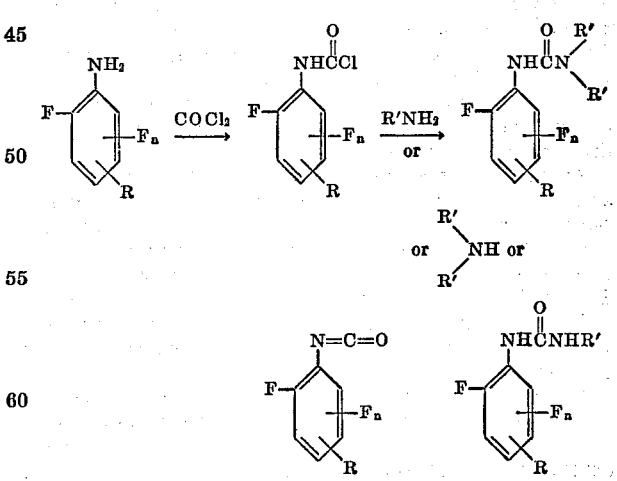

(4) Reaction of a fluorinated aniline with an alkyl or aryl isothiocyanate:

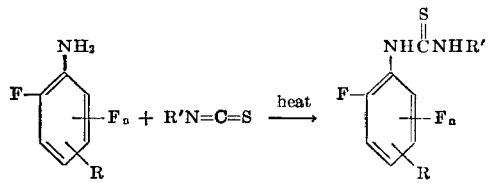

(5) Reaction of a fluorinated aniline with a dialkyl thiocarbamoyl chloride:

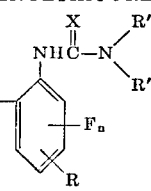

Nonlimiting examples of polyfluorinated aniline, which can be utilized in the above reactions are:

2,5-difluoroaniline,
2,3,4-trifluoroaniline,
2,4-difluoroaniline,
2,3,5-trifluoroaniline,
2,3,4,5-tetrafluoroaniline,
2,3,5,6-tetrafluoroaniline,
pentafluoroaniline,
5-chloro-2,3,4-trifluoroaniline,
5-cyano-2,3,4-trifluoroaniline,
5-propylthio-2,3,4-trifluoroaniline,
4-chloro-2,3,5-trifluoroaniline,
3-cyano-2,4,5-trifluoroaniline,
4-methyl-2,3,5,6-tetrafluoroaniline,
4-methoxy-2,3,5,6-tetrafluoroaniline,
5-nitro-2,3,4-trifluoroaniline,
4-nitro-2,3,5-trifluoroaniline,
5-methyl-2,3,6-trifluoroaniline,
4-thiocyano-2,3,5,6-tetrafluoroaniline,
4-hydroxy-2,3,5,6-tetrafluoroaniline, etc.

The determination as to the particular synthetic procedure to be utilized to produce a specific compound of the present invention is well within the knowledge of one skilled in the art.

The methods of preparation of the polyfluorinated anilines utilized as the starting materials in the present invention are well known in the literature. For example, the preparation of pentafluoroaniline from hexafluorobenzene or 2,3,5,6-tetrafluoroaniline from pentafluorobenzene can be accomplished by treatment of hexafluorobenzene or pentafluorobenzene with ammonium hydroxide at a temperature of about 167° C. This reaction is reported in the Journal of the Chemical Society, by G. M. Brooke et al., page 1768 (1960). The hexafluorobenzene (U.S. Pat. 2,586,364) and pentafluorobenzene (E. Nield, R. Stephens and J. C. Tatlow, Journal of the Chemical Society, page 166 (1959) utilized in the foregoing synthesis have been prepared previously.

Another polyfluorinated aniline, 2,3,4,5 tetrafluoroaniline, can be prepared by the nitration of 2,3,4,5 tetrafluorobenzene with nitric acid in the presence of sulfuric acid, followed by reduction of the resultant nitro derivative with iron and hydrochloric acid, as reported by Belf et al., Chem. and Ind. pages 238–239 (1966). Similarly, the 2,4,5- and the 2,3,5-trifluoroanilines can be prepared by a nitration procedure and subsequent reduction with iron and hydrochloric acid.

Nonlimiting examples of suitable polyfluorinated phenyl ureas and thioureas that can be synthesized according to the foregoing methods and that are of utility in the present invention are shown in Table I.

TABLE I.—POLYFLUORINATED PHENYLUREAS AND PHENYLTHIOUREAS

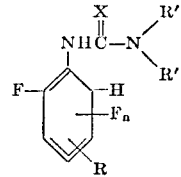

| R' | R | F_n | X |
|---|---|---|---|
| Ethyl, H | H | 5-fluoro | O or S. |
| n-Octyl, H | H | 3,5-difluoro | Do. |
| Cyclopropyl, H | H | 3,4,5-trifluoro | Do. |
| 2-methyl cyclohexyl, methyl | 5-chloro | 3,4-difluoro | Do. |
| 4-chlorobutyl, methyl | Fluoro | Trifluoro | Do. |
| Cyclopropyl methyl, H | H | 4-fluoro | Do. |
| Allyl, alkyl | H | 3,5-difluoro | Do. |
| Crotyl, H | 4-methyl | 3,5,6-trifluoro | Do. |
| n-Butoxy, methyl | 4-chloro | do | Do. |
| Propargyl, methyl | 3-ethoxy | 5-fluoro | Do. |
| Propylaminopropyl, H | H | 3,4,5-trifluoro | Do. |
| Dipropylaminopropyl, H | 4-hydroxy | 3,5-difluoro | Do. |
| Diethylaminoethyl, H | H | do | Do. |
| Benzyl, benzyl | H | do | Do. |
| p-Biphenyl, H | 4-cyano | do | Do. |
| 2,6-dimethylphenyl, H | 4-methoxy | do | Do. |
| Phenyl, H | 3-methyl | 4,5-difluoro | Do. |
| 2-cyanoethyl, H | H | 3,4,5-trifluoro | Do. |
| 1-naphthyl, H | H | do | Do. |
| 2-cyanoethyl, 2-cyanoethyl | H | do | Do. |
| Methyl, H | 5-propylthio | 3,4-difluoro | Do. |
| Methyl, H | 3-cyano | 4,5-difluoro | Do. |
| Propyl, H | 4-methoxy | 3,5,6-trifluoro | Do. |
| Methyl, methyl | 5-nitro | 3,4-difluoro | Do. |
| Methyl, propargyl | Fluoro | Trifluoro | Do. |
| Methyl, methyl | 3-nitro | 4,5-difluoro | Do. |
| Methyl, methyl | 3-chloro | do | Do. |
| Methyl, methoxy | 3-methyl | do | Do. |
| Propargyl, methyl | 4-ethoxy | 3,5-difluoro | Do. |
| Methyl, methoxy | 4-thiocyano | 3,5,6-trifluoro | Do. |

A preferred class of fluorinated phenyl ureas consists of those compounds which retain an unsubstituted ortho position on the phenyl ring as illustrated in the following structural formula:

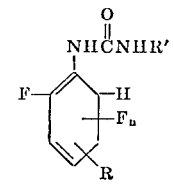

wherein the 3,4, and 5 positions can be substituted by fluorine and an R group as previously defined, and wherein R' is as previously defined and $n$ may be 1 or 2.

Another preferred class of fluorinated phenyl ureas consists of the polyfluorophenyl-N'-alkyl ureas defined by the following structural formula:

$$\begin{array}{c} O \\ \| \\ NHCNHR' \end{array}$$

F—⟨—H
   ⟨—F_n
   R wherein $n$ is an integer of from 1 to 3 and R and R' are as previously defined.

As previously noted, the novel pesticidal compositions or formulations of this invention are surprisingly effective and show unexpected advantages over known, related compounds. For example, the N-methyl urea of 2,3,4,5-tetrafluoroaniline shows a very high degree of cotton tolerance, even greater than that exhibited by commercial cotton herbicides, such as, e.g. N,N-dimethyl-N'-(3,4-dichlorophenyl) urea N,N - dimethyl - N' - (3 - trifluoromethylphenyl) urea.

This compound also exhibits marked safety when used on tomatoes as a pre-emergence herbicide, unlike many of the known urea herbicides, such as N,N-dimethyl-N'-

(3,4-dichlorophenyl) urea and N,N-dimethyl-N'-(p-chlorophenyl) urea.

As previously noted, the polyfluorinated phenyl ureas and thioureas of this invention are useful as pesticides, particularly as herbicides. When used as either pre- or post-emergent herbicides, the biologically active ingredients of this invention are preferably formulated with a suitable carrier or diluent or combinations thereof.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjecting to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes; or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol to neutralize this activity and thereby prevent possible decomposition of the active ingredient.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax, for example, beeswax or a mineral wax such as paraffin wax or montan wax, or a chlorinated mineral wax, or a microcrystalline wax such as those available under the registered trademark "Mikrovan wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 95% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending, agent, and if desired, a finely divided solid carrier and/or a wetting agent. The active ingredient can be in particulate form or adsorbed on the carrier and preferably constitutes at least about 10%, more preferably at least about 35%, by weight of the composition. The concentration of the dispersing agent should in general, be between about 0.5 and about 5% by weight of the total composition, although larger or smaller amounts can be used if desired.

The dispersing agent used in the composition of this invention can be any substance having definite dispersing, i.e. deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol, etc. can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate, etc.

Granulated or pelleted compositions comprising a suitable carrier having the active ingredient incorporated therein are also included in this invention. These can be prepared by impregnating a granular carrier with a solution of the active ingredient or by granulating a mixture of a finely divided solid carrier and the active ingredient. The carrier used can contain a fertilizer or fertilizer mixture, as for example, a superphosphate.

The compositions of this invention can also be formulated as solutions of the active ingredient in an organic solvent or mixture of solvents, such as for example, alcohols; ketones; especially acetone; ethers; hydrocarbons; etc.

Where the toxicant itself is a liquid these materials can be sprayed on crops without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersions of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated by the following examples, but it is to be understood that the present invention, in its broadest aspects, is not necesarily limited in terms of the reactants or catalysts employed, specific temperatures, residence times, separation techniques and other process conditions by which the compounds or formulations of this invention are prepared or used.

EXAMPLE 1

Preparation of N-methyl-N'-(2,3,4,5-tetrafluorophenyl) urea

Into a 100 ml. Erlenmeyer flask equipped with a magnetic stirrer and a drying tube was placed 30 ml. of dry benzene, 4.1 g. (.025 mole) of 2,3,4,5-tetrafluoroaniline, and 0.5 ml. of triethylamine. 1.7 g. (.0275 mole) of methyl isocyanate was then added and the mixture was stirred overnight at ambient temperature. The crystalline white product was then filtered and dried in vacuo to yield 2.0 g. of N-methyl-N'-(2,3,4,5-tetra-fluorophenyl) urea, M.P. 170.5–172° C.

Calculated for $C_8H_6F_4N_2O$ (percent): C, 43.2; H, 2.7; N, 12.6. Found (percent): C, 43.3; H, 3.1; N, 13.3.

EXAMPLE 2

Preparation of N-methyl-N'-(2,5-difluorophenyl) urea

Into a 500 ml. 3-neck round bottom flask equipped with a stirrer, condenser and a dropping funnel was placed 250 ml. of dry benzene, 3 ml. of triethylamine and 37.5 g. (0.29 mole) of 2,5-difluoroaniline. Methyl isocyanate 20.0 g., (0.35 mole) was then added dropwise with stirring over a one hour period. The mixture was stirred overnight. The product was then filtered, washed with a solution of 200 ml. of benzene and 10 ml. of ethanol, and dried in vacuo to yield 28 g. of N-methyl-N'-(2,5-difluorophenyl) urea, M.P. 181–184° C.

Calculated for $C_8H_8F_2N_2O$ (percent): C., 51.7: H, 4.3; N, 15.06. Found (percent): C, 52.3; H, 4.44; N, 15.38.

EXAMPLE 3

Preparation of N-methyl-N'-(2,3,5,6-tetrafluorophenyl) urea

Into a 50 ml. Erlenmeyer flask equipped with a magnetic stirrer and a drying tube was placed 30 ml. of dry benzene, 0.5 ml. of triethylamine, and 4.1 g. (0.025 mole) of 2,3,5,6-tetrafluoroaniline. Methyl isocyanate 2.0 g. (0.035 mole) was then added and the mixture was heated at reflux for 24 hours. The white crystalline product was then filtered and dried in vacuo to yield 1.9 g. of N-methyl-N'-(2,3,5,6-tetrafluorophenyl) urea, M.P. 173–176° C.

Calculated for $C_8H_6F_4N_2O$ (percent): C, 43.2; H, 2.7; N, 12.6. Found (percent): C, 42.8; H, 2.6; N, 12.3.

EXAMPLE 4

Preparation of N,N-dimethyl-N'-(2,5-difluorophenyl) urea

Into a 100 ml. Erlenmeyer flask equipped with a drying tube is placed 50 ml. of dry benzene, 0.5 ml. of triethylamine, 3.23 g. (.025 mole) of 2,5-difluoroaniline, and 3.23 g. (.03 mole) of dimethyl carbamoyl chloride. The flask is then agitated to achieve homogeniety and allowed to stand for two weeks. The reaction mixture is then washed successively with two 25 ml. portions of 10% aqueous sodium carbonate solution and two 25 ml. portions of water. The organic layer is then dried overnight over 5 g. of anhydrous sodium sulfate. The mixture is then filtered and the benzene removed in vacuo to yield N,N-dimethyl-N'-(2,5-difluorophenyl) urea. The structure is determined by NMR spectroscopy.

EXAMPLE 5

Preparation of N,N-dimethyl-N'-(2,3,4,5 tetrafluorophenyl) urea

Into a 100 ml. Erlenmeyer flask equipped with a drying tube is placed 50 ml. of dry benzene, 0.5 ml. of triethylamine, 4.1 g. (.025 mole) of 2,3,4,5-tetrafluoroaniline, and 3.23 g. (.03 mole) of dimethyl carbamoyl chloride. The flask is then agitated to achieve homogeniety and allowed to stand for two weeks. The reaction mixture is then washed successively with two 25 ml. portions of 10% aqueous sodium carbonate solution and two 25 ml. portions of water. The organic layer is then dried overnight over 5 g. of anhydrous sodium sulfate. The mixture is then filtered and the benzene removed in vacuo to yield N,N-dimethyl-N'-(2,5 difluorophenyl) urea. The structure is determined by NMR spectroscopy.

In the following examples, representative fluorinated phenylurea derivatives from those prepared in the previous examples were evaluated for both pre- and post-emergent herbicidal activity and compared with known herbicides having structural similarity. The test procedure employed was as follows:

Two flats seeded with six crops (cotton, soybean, tomato, corn, rice and oats) and six weeds (mustard, morning-glory, velvet leaf, crabgrass, Johnson grass and foxtail) were sprayed with a formulation containing the test chemical and acetone as solvent, at various rates in terms of pounds per acre. The flats were then held in the greenhouse and a response rated after 12 to 16 days. The response was rated by a scale of 0 to 10, conventionally defined as follows:

0 = no injury
1–3 = slight injury
4–6 = moderate injury, plants may die
7–9 = severe injury, plants will probably die
10 = all plants dead (complete kill)

EXAMPLE 6

In the example, the activty of N-methyl-N'-(2,3,4,5-tetrafluorophenyl) urea synthesized in Example 1 was evaluated and compared with the known N-methyl-N'-(o-fluorophenyl) urea. The data and results are shown in Table II. The cotton tolerance of the polyfluorinated compound of the present invention is quite apparent as compared with the known monofluorinated compound. The tomato tolerance of the polyfluorinated compound when used as a pre-emergent herbicide is also readily apparent.

EXAMPLE 7

In this example, the activity of N-methyl-N'-(2,5-difluorophenyl) urea synthesized in Example 2 was evaluated and compared with the known 2,5-dichloro analog, i.e. N-methyl-N'-(2,5-dichlorophenyl) urea. The data and results are shown in Table III.

EXAMPLE 8

In this example, the activities of N-methyl-N'-(2,3,4,5-tetrafluorophenyl) urea synthesized in Example 1, and N-methyl-N'-(2,3,5,6-tetrafluorophenyl) urea synthesized in Example 3 were evaluated and compared. The basis for one of the preferred embodiments of the present invention (no substitution in the 6-position of the phenyl ring) is seen in the data and results for this example as shown in Table IV, wherein it is shown that fluoro substitution in the 6-position results in a lowering of herbicidal activity.

EXAMPLE 9

In this example, the cotton tolerance of N-methyl-N'-(2,3,4,5-tetrafluorophenyl) urea was compared with a known herbicide, i.e. N,N-dimethyl-N'-(3,4-dichlorophenyl) urea (Diuron). The data and results are shown in Table V. The procedure used was similar to that previously employed. The cotton tolerance of the fluorinated compound of the present invention is readily apparent.

TABLE II.—HERBICIDE ACTIVITY
[Cotton tolerance]

| Structure | Rate | Corn | Soybean | Cotton | Rice | Morning Glory | Tomato | Oats | Cabgrass | JG | Yellow Foxtail | Velvet Leaf | Mustard |
|---|---|---|---|---|---|---|---|---|---|---|---|---|---|
| Post-emergence: | | | | | | | | | | | | | |
| 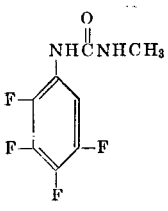 | 2.5 | 10 | 10 | 0 | 9 | 10 | 10 | 9 | 10 | 7 | 10 | 7 | 10 |
| | 1.25 | 6 | 8 | 0 | 4 | 7 | 10 | 7 | 9 | 4 | 9 | 4 | 10 |
| 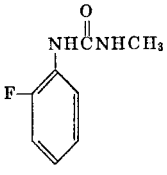 | 2.5 | 10 | 10 | 10 | 7 | 10 | 10 | 10 | 9 | 6 | 6 | 9 | 10 |
| | 0.63 | 5 | 10 | 10 | 6 | 10 | 10 | 10 | 9 | 6 | 6 | 10 | 10 |
| Pre-emergence: | | | | | | | | | | | | | |
| 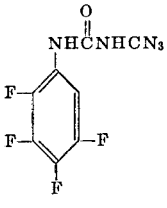 | 2.5 | 2 | 5 | 2 | 2 | 2 | 0 | 7 | 9 | 7 | 9 | 10 | 9 |
| | 1.25 | 2 | 5 | 0 | 1 | 1 | 0 | 6 | 9 | 6 | 7 | 9 | 9 |
| 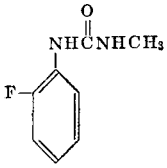 | 2.5 | 4 | 5 | 7 | 4 | 10 | 7 | 7 | 5 | 5 | 6 | 5 | 10 |
| | 0.63 | 2 | 2 | 4 | 1 | 9 | 5 | 6 | 5 | 5 | 5 | 4 | 7 |

TABLE III.—HERBICIDE ACTIVITY

| Structure | Rate | Corn | Soybean | Cotton | Rice | Morning Glory | Tomato | Oats | Cabgrass | JG | Yellow Foxtail | Velvet Leaf | Mustard |
|---|---|---|---|---|---|---|---|---|---|---|---|---|---|
| Post-emergence | | | | | | | | | | | | | |
| 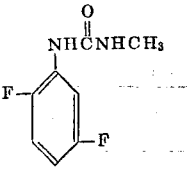 | 1.25 | 7 | 10 | 10 | 5 | 10 | 10 | 10 | 10 | 10 | 10 | 10 | 10 |
| | 0.63 | 4 | 10 | 10 | 4 | 10 | 10 | 10 | 10 | 10 | 10 | 10 | 10 |
| 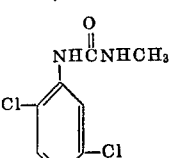 | 1.25 | 0 | 2 | 0 | 0 | 3 | | 0 | 2 | | 4 | | 7 |
| | 0.63 | 0 | 2 | 0 | 0 | 3 | | 0 | 0 | | 2 | | 4 |

TABLE III—Continued

| Structure | Rate | Corn | Soybean | Cotton | Rice | Morning Glory | Tomato | Oats | Cabgrass | JG | Yellow Foxtail | Velvet Leaf | Mustard |
|---|---|---|---|---|---|---|---|---|---|---|---|---|---|
| Pre-emergence: | | | | | | | | | | | | | |
| 2,5-difluorophenyl NHC(O)NHCH₃ | 10 | 7 | 7 | 8 | 3 | 10 | 9 | 8 | 6 | 3 | 5 | 7 | 10 |
| 2,5-dichlorophenyl NHC(O)NHCH₃ | 10 | | | | | 4 | | | 1 | | 4 | | 6 |

TABLE IV.—N-METHYL-N'-(2,3,4,5-TETRAFLUOROPHENYL) UREA VS. N-METHYL-N'-(2,3,5,6-TETRAFLUOROPHENYL) UREA

| Structure | Rate | Corn | Soybean | Cotton | Rice | Morning Glory | Tomato | Oats | Cabgrass | JG | Yellow Foxtail | Velvet Leaf | Mustard |
|---|---|---|---|---|---|---|---|---|---|---|---|---|---|
| Pre-emergence: | | | | | | | | | | | | | |
| 2,3,4,5-tetrafluorophenyl NHC(O)NHCH₃ | 2.5 | 2 | 5 | 2 | 2 | 2 | 0 | 7 | 9 | 7 | 9 | 10 | 9 |
|  | 1.25 | 2 | 5 | 0 | 1 | 1 | 0 | 6 | 9 | 6 | 7 | 9 | 9 |
| 2,3,5,6-tetrafluorophenyl NHC(O)NHCH₃ | 2.5 | 0 | 0 | 0 | 0 | 1 | 1 | 0 | 0 | 0 | 0 | 0 | 3 |
| Post-emergence: | | | | | | | | | | | | | |
| 2,3,4,5-tetrafluorophenyl NHC(O)NHCH₃ | 2.5 | 10 | 10 | 9 | 9 | 10 | 10 | 9 | 10 | 7 | 10 | 7 | 10 |
| 2,3,5,6-tetrafluorophenyl NHC(O)NHCH₃ | 2.5 | 9 | 9 | 9 | 2 | 5 | 9 | 3 | 2 | 3 | 3 | 9 | 10 |

TABLE V
[Cotton tolerance]

| Structure | Rate | Cotton | Broad leaf weeds | Grassy weeds |
|---|---|---|---|---|
| Post-emergence: | | | | |
| 3,4-dichlorophenyl NHC(O)N(CH₃)₂ | 2.5 | 6.0 | 10.0 | 10.0 |
|  | 1.25 | 4.0 | 10.0 | 10.0 |
| 2,3,4,5-tetrafluorophenyl NHC(O)NHCH₃ | 2.5 | 0 | 10.0 | 10.0 |
|  | 1.25 | 0 | 10.0 | 10.0 |

TABLE V—Continued

| Structure | Rate | Cotton | Broad leaf weeds | Grassy weeds |
|---|---|---|---|---|
| Pre-emergence: [3,4-dichlorophenyl N,N-dimethylurea] | 2.5<br>1.25 | 9<br>0 | 5.3<br>3.7 | 7.7<br>6.3 |
| [2,4,5-trifluorophenyl N-methylurea] | 2.5<br>1.25 | 0<br>0 | 9.3<br>7.7 | 8.3<br>7.0 |

The following examples illustrate typical pesticidal compositions or formulations of this invention:

EXAMPLE 10

A wettable powder concentrate that is diluted to the desired concentration by dispersing it in water has the following composition:

| | Parts |
|---|---|
| Active ingredient | 50. |
| Solid carrier, e.g. (attapulgite) { 20 synthetic calcium silicate. 22 kaolinite clay. | |
| Dispersant (monocalcium salt of polymeric alkyl aryl sulfonic acid) | 4. |
| Wetting agent (sodium alkyl naphthalene Sulfate-Nekal BA-75) | 4. |

EXAMPLE 11

A suitable herbicide solution has the following composition:

| | Parts |
|---|---|
| Isopropanol | 95 |
| Active ingredient | 5 |

In addition, compounds of this invention may be suspended in, for example, a paraffin oil and sprayed as a suspension of herbicide in oil.

It should be understood from the foregoing that the above description is merely illustrative of the preferred embodiments and specific examples of the present invention and that in all of which embodiments and examples, variation, such as, e.g., those previously described can be made by those skilled in the art without departing from the spirit and purview thereof, the invention being defined by the following claims.

What is claimed is:

1. A compound of the formula:

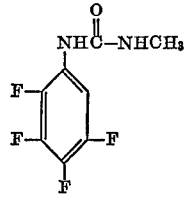

2. A compound of the formula:

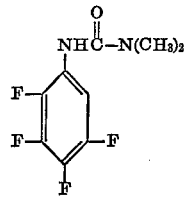

References Cited

FOREIGN PATENTS

| | | | |
|---|---|---|---|
| 6511107 | 2/1966 | Netherlands | 260—555 A |
| 851 | 1/1967 | Japan | 260—555 A |

OTHER REFERENCES

Buu-Hoï et al.: J. Chem. Soc. [1958] pp. 2815-2821.

LEON ZITVER, Primary Examiner

M. W. GLYNN, Assistant Examiner

U.S. Cl. X.R.

260—453 R, 454, 465, 552 R, 553 C; 252—106, 107, 306; 71—99, 104, 105, 120